Patented Feb. 20, 1951

2,542,370

UNITED STATES PATENT OFFICE 2,542,370

PRODUCTION OF THIOPHOSPHITES

Donald R. Stevens, Wilkinsburg, and Roderick S. Spindt, Gibsonia, Pa., assignors to Gulf Research & Development Company, Pittsburgh, Pa., a corporation of Delaware No Drawing. Application September 16, 1948, Serial No. 49,657

13 Claims. (Cl. 260—461)

This invention relates to a process for the production of organic thiophosphites. More particularly, the invention relates to a novel process for the production of organic trithiophosphites wherein elemental phosphorus is reacted with an organic disulfide to produce the corresponding thiophosphite.

We have discovered, in accordance with the invention, that by reacting an organic compound containing an —S—S— linkage with elemental phosphorus the linkage is broken and the resulting fragments are regrouped and combined with the phosphorus to form thiophosphite compounds. When the organic compound is a symmetrical dialkyl disulfide, the reaction may be represented by the following equation:

$$3\,\text{Alkyl}-S-S-\text{Alkyl} + 2P \longrightarrow 2\,\text{Alkyl}-S-\underset{\underset{S-\text{Alkyl}}{|}}{P}-S-\text{Alkyl}$$

The reaction involved in the present process is of broad application, since the specific nature of the organic radicals attached to the —S—S— linkage does not appear to have a controlling effect upon whether the phosphorus will be effective to break the linkage and cause the resultant recombination and formation of thiophosphite compounds. For example, the organic compound containing the —S—S— linkage may be a symmetrical or unsymmetrical organic disulfide in which the hydrocarbon radicals are open or closed chain radicals which may contain substituents which are inert toward phosphorus; that is, the organic radicals may be selected from the group of alkyl, aryl, aralkyl, alkaryl, and cycloalkyl radicals. The invention also includes a process in which the compound containing the —S—S— linkage is one in which the sulphur atoms of the linkage are included in a ring. The reaction involved in the present process when the organic compound is an open compound may be represented more generally by the following equation:

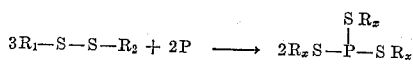

$$3R_1-S-S-R_2 + 2P \longrightarrow 2R_xS-\underset{\underset{SR_x}{|}}{P}-SR_x$$

wherein $R_1$ and $R_2$ represent the same or different organic radicals selected from alkyl, aryl, aralkyl, alkaryl, and cycloalkyl radicals, and $R_x$ represents either $R_1$ or $R_2$. As noted above, the radicals attached to the —S—S— linkage may contain substituents which are of an inert character toward phosphorus, such as for example, alkyl, alkoxy, halogen, and tertiary-amino substituents. The organic thiophosphite compounds prepared may be symmetrical or unsymmetrical with respect to the organic radicals they contain depending on whether a symmetrical compound or an unsymmetrical compound or a mixture of compounds containing the —S—S— linkage is employed as the starting material.

It will be recognized, therefore, that a wide variety of disulfide compounds may be reacted with phosphorus in accordance with the invention to produce valuable thiophosphite compounds. Among such disulfide compounds there may be mentioned the symmetrical and unsymmetrical alkyl disulfides, particularly those in which the alkyl groups contain 1 to 18 carbon atoms, such as di-ethyl disulfide, di-n-propyl disulfide, di-isopropyl disulfide, di-butyl disulfide, di-isobutyl disulfide, di-n-amyl disulfide, di-dodecyl disulfide, ethyl butyl disulfide, propyl amyl disulfide, and methyl hexyl disulfide. Of the alkyl disulfides those containing alkyl groups containing from 1 to 8 carbon atoms are particularly valuable starting materials because the reaction proceeds evenly with good yields and useful trialkyl trithiophosphites are obtained. Other examples of suitable starting materials are di-phenyl disulfide, di-naphthyl disulfide, di-tolyl disulfide, di-pyridyl disulfide, di-benzyl disulfide, di-phenyl ethyl disulfide, di-cyclohexyl disulfide, 1,2-dithiacyclopentane, 1,2-dithiacyclohexane, butyl phenyl disulfide, propyl benzyl disulfide, and benzyl phenyl disulfide. Di-acyl disulfides such as di-acetyl disulfide may also be employed as the starting material.

It will be understood that it is not necessary to employ single compounds as the starting materials, as for many purposes mixed thiophosphite compounds are entirely suitable. Accordingly, the disulfides subjected to reaction with phosphorus in accordance with the invention may be mixtures of disulfides such as those obtained in the refining of various petroleum fractions. For example, mercaptans are extracted from petroleum fractions by the use of caustic solutions which may contain solutizing agents such as methyl alcohol or sodium or potassium isobutyrate. These mercaptans may be recovered from the extract in concentrated form and may then be oxidized to disulfides by conventional methods such as air blowing, for example. A mixture of disulfides obtained in this way may be converted into a mixture of trithiophosphites by reacting the mixture with phosphorus in accordance with the present invention. The mixture of disulfides produced in the doctor treatment of gasolines may also be reacted with phosphorus in accordance with this invention.

The process of the invention is carried out under such conditions as to accomplish the cleavage of the —S—S— linkage of the sulfide compound and to cause the recombination resulting in the production of the thiophosphite compound while avoiding conditions sufficiently drastic to cause destruction of the desired thiophosphite. We have found that the process may be carried out efficiently by intimately contacting elemental phosphorus with the organic sulfide in liquid phase at mildly elevated temperatures. When operating in this way, it is desirable to insure the intimate contact by agitation, for example by means of a stirrer, and the temperature should be such as to be above the temperature causing merely simple solution of the phosphorus in the disulfide and below that resulting in destruction of the thiophosphite. Temperatures of this latter order are evidenced by the production of such decomposition products as phosphorus sulfides, phosphines, etc. The specific temperatures will vary, of course, in accordance with the organic sulfide compound employed, the desired time of reaction, the reactivity of the phosphorus used, and the intimacy of contact. Thus, where a short reaction time is not essential, a lower temperature may be used than when it is important to carry out the reaction over a relatively short period. The conditions necessary to produce the desired thiophosphite compounds may also be attained in vapor phase reactions provided the time of contact between the vaporized sulfide compound and the phosphorus is sufficiently short to accomplish the cleavage of the —S—S— linkage and the desired recombination while avoiding the product decomposition which tends to take place at the high temperatures.

In a preferred manner of carrying out the process of the invention, the organic disulfide, which may be liquid at ordinary temperatures or a solid whose melting point is below the reaction temperature, is introduced into a reaction vessel provided with heating and agitating means. Oxygen is then removed from the atmosphere in contact with the reaction mixture by displacing air from the vessel with a gas inert to phosphorus, such as nitrogen, carbon dioxide, hydrogen, methane, natural gas, etc. The phosphorus is then added to the organic disulfide in an amount such that there is excess of disulfide to insure substantially complete reaction of the phosphorus. The reaction mixture is then heated and agitated until the mixture reaches the desired reaction temperature. The mixture is maintained at this temperature until the reaction is substantially complete, as indicated by the absence of fuming of a sample withdrawn from the reaction mixture. Whether the reaction mixture had been heated to a sufficiently high temperature to accomplish the reaction may be determined simply by removing a sample from the mixture and cooling. If the temperature was too low for reaction, phosphorus will be precipitated from the cooled mixture. Following the completion of the reaction, the desired trithiophosphite may be separated from the reaction mixture by any suitable method, such as by fractional distillation at reduced pressure.

The invention may be illustrated by the following examples:

Example I 535 parts by weight of di-n-butyl disulfide and 62 parts by weight of yellow phosphorus are placed in a reaction vessel provided with a heater and an agitator. Air is displaced from the reaction vessel by passing a stream of nitrogen gas through it and introduction of nitrogen is continued during the course of the reaction. The reaction mixture is agitated and heated to about 200° C. and, while continuing the agitation, is maintained at this temperature for two hours. At the end of this time, a sample removed from the mixture will not fume when air is bubbled through it, indicating completion of the reaction. The reaction mixture is then cooled and is distilled at about 1.5 mm. mercury absolute pressure. A product boiling in the range of about 160°–170° C. is obtained in an amount equal to 70 per cent of the theoretical. This product is shown by analysis and by comparison with reported properties of tri-n-butyl trithiophosphite to be tri-n-butyl trithiophosphite.

Example II

In this example a mixture of tri-alkyl trithiophosphites in which the alkyl groups are methyl and amyl groups is produced by reacting methyl amyl d sulfie with phosphorus substantially as described in Example I. Thus, an amount of the methyl amyl disulfide employed is in slight excess of that theoretically required for reaction with the phosphorus and the resultant mixture of methyl amyl disulfide and phosphorus is maintained at a temperature of about 200° C. until a sample of the mixture does not fume when air is bubbled through it.

Example III 760 parts by weight of di-benzyl disulfide and 62 parts by weight of yellow phosphorus are reacted substantially in the manner described in Example I. In this case, however, it is advantageous to maintain the temperature at about 200° C. for about 3 hours in order to insure completion of the reaction. The product obtained is tri-benzyl trithiophosphite.

Example IV 692 parts by weight of di-cyclohexyl disulfide are reacted with 62 parts by weight of phosphorus substantially in the manner described in Example I. The desired tri-cyclohexyl trithiophosphite is obtained in good yields by agitating the mixture at a temperature of about 190° C. for about 8 hours.

It will be understood that the foregoing examples are merely illustrative of the invention and that other valuable thiophosphites may be prepared in a similar manner by substituting an equivalent proportion of an organic disulfide compound of the class herein referred to, particularly one of the disulfide compounds specifically mentioned. Further, the conditions employed may be varied in accordance with the principles hereinbefore described; for example, provided time is not important, lower temperatures may be employed. We prefer, however, when carrying out the process as disclosed in the examples, to maintain a reaction temperature within the range of about 150° to 250° C. In a given case, the most effective temperature can be determined by determining the rate of reaction by testing samples removed from the mixture as described above.

The phosphorus employed in the examples is referred to as yellow phosphorus. This form of phosphorus is also sometimes referred to as white phosphorus. For most applications of the invention we prefer to employ this form because it is readily obtainable and reactive. It will be understood, however, that other forms of phosphorus may be employed. Red phosphorus is converted to yellow phosphorus at elevated temperatures and therefore this form may be employed effectively when the reaction is carried out at such temperatures.

In cases where the organic sulfide compound employed as the starting material melts at a relatively high temperature, it is advantageous to employ solvents for the disulfide which are inert both with respect to the disulfide and the phosphorus. Such inert solvents or diluents may also be employed in reactions involving liquid disulfides, although in this case the purpose is primarily to obtain better control of the course of the reaction. Saturated hydrocarbon liquids, such as naphtha fractions of paraffin base crude oils, and higher boiling aromatics such as alkylbenzenes, naphthalene, methyl naphthalenes, etc., are examples of suitable solvents.

We have pointed out above that mixtures of organic compounds containing —S—S— linkages may be employed as starting materials. The products obtained are valuable because they are substantially completely composed of thio-phosphite compounds, preferably trithiophosphite compounds. It is essential, however, that the starting material, whether a single compound or a mixture of compounds containing —S—S— linkages, should be substantially free from other compounds reactive with phosphorus, since otherwise the product is a complex mixture from which it is impossible, as a practical matter, to recover the desired phosphite compounds.

In the foregoing description we have referred to thiophosphites and thiophosphite compounds. In accordance with the preferred embodiment of the invention, where disulfides are employed as starting materials, the products may be simple trithiophosphites. However, if organic polysulfides such as tri- or tetra-sulfide compounds, for example, are used, the products will contain additional sulfur atoms. Where thiophosphites and thiophosphite compounds are referred to generally herein, such products are also included.

Obviously many modifications and variations of the invention, as hereinbefore set forth, may be made without departing from the spirit and scope thereof and therefore only such limitations should be imposed as are indicated in the appended claims.

We claim:

1. A process of producing an organic thiophosphite compound which comprises reacting elemental phosphorus with an organic compound containing an —S—S— linkage in the substantial absence of other organic compounds reactive with phosphorus at an elevated temperature above the temperature of simple solution of said phosphorus in said organic compound and below the decomposition temperature of said organic thiophosphite compound and recovering said organic thiophosphite compound.

2. A process of producing an organic thiophosphite compound which comprises reacting elemental phosphorus with an organic compound containing an —S—S— group linked at each side to a carbon atom of said organic compound, in the substantial absence of other organic compounds reactive with phosphorus and at an elevated temperature above the temperature of simple solution of said phosphorus in said organic compound and below the decomposition temperature of said organic thiophosphite compound and recovering said organic thiophosphite compound.

3. A process of producing an organic trithiophosphite compound which comprises reacting elemental phosphorus with an organic compound of the general formula $R_1$—S—S—$R_2$ wherein $R_1$ and $R_2$ are the same or different and each represents a radical selected from the group consisting of the alkyl, aryl, alkaryl, aralkyl, and cyclo-alkyl radicals, in the substantial absence of other organic compounds reactive with phosphorus and at an elevated temperature above the temperature of simple solution of said phosphorus in said organic compound and below the decomposition temperature of the corresponding trithiophosphite, and recovering said corresponding trithiophosphite.

4. A process of producing an organic thiophosphite compound which comprises reacting elemental yellow phosphorus with an organic compound containing an —S—S— linkage, in liquid phase, in the substantial absence of other organic compounds reactive with phosphorus, and at an elevated temperature below the decomposition temperature of said organic thiophosphite compound, and recovering said organic thiophosphite compound.

5. A process of producing an organic thiophosphite compound in accordance with claim 4 in which said elevated temperature is within the range of about 150° to 250° C.

6. A process of producing a trialkyl trithiophosphite compound which comprises reacting elemental phosphorus with a dialkyl disulfide in the substantial absence of other organic compounds reactive with phosphorus and at an elevated temperature below the decomposition temperature above the temperature of simple solution of said phosphorus in said dialkyl disulfide and of said trialkyl trithiophosphite compound, and recovering said trialkyl trithiophosphite compound.

7. A process in accordance with claim 6 in which the alkyl groups of said dialkyl disulfide contain from 1 to 8 carbon atoms.

8. A process in accordance with claim 7 in which the reaction between the elemental phosphorus and the dialkyl disulfide is carried out in the presence of an inert atmosphere.

9. A process of producing a trialkyl trithiophosphite compound which comprises reacting elemental phosphorus with a dialkyl disulfifide in the substantial absence of other organic compounds reactive with phosphorus and at an elevated temperature below the decomposition temperature of said trialkyl trithiophosphite compound, said elevated temperature being within the range of about 150° to 250° C. and recovering said trialkyl trithiophosphite compound.

10. A process in accordance with claim 9 in which the alkyl groups contain 1 to 8 carbon atoms.

11. A process of producing tri-n-butyl trithiophosphite which comprises reacting elemental phosphorus with di-n-butyl disulfide in liquid phase in the substantial absence of other organic compounds reactive with phosphorus and at an elevated temperature below the decomposition temperature of said tri-n-butyl trithiophosphite, said elevated temperature being within the range of about 150° to 250° C., and recovering said tri-n-butyl trithiophosphite.

12. A process of producing tri-n-butyl trithiophosphite which comprises reacting elemental phosphorus with di-n-butyl disulfide in liquid phase in the substantial absence of other organic compounds reactive with phosphorus, in the presence of an inert atmosphere, and at a temperature of about 200° C., and recovering the resulting tri-n-butyl trithiophosphite.

13. A process in accordance with claim 12 in which the amount of di-n-butyl disulfide is in excess of that theoretically required for reaction with the phosphorus to produce tri-n-butyl tri-thiophosphite.

DONALD R. STEVENS.
RODERICK S. SPINDT.

REFERENCES CITED

The following references are of record in the file of this patent:

UNITED STATES PATENTS

| Number | Name | Date |
|---|---|---|
| 1,593,232 | Whitworth | July 20, 1926 |
| 1,772,386 | Derby | Aug. 5, 1930 |

OTHER REFERENCES

Schonberg: "Ber. Deutsch. chem. Ges.," vol. 68 (1935) pp. 163–164.

Certificate of Correction

Patent No. 2,542,370 February 20, 1951

DONALD R. STEVENS ET AL.

It is hereby certified that error appears in the printed specification of the above numbered patent requiring correction as follows:

Column 6, lines 29 and 30, strike out the words "below the decomposition temperature" and insert the same after "disulfide and" in line 31;

and that the said Letters Patent should be read as corrected above, so that the same may conform to the record of the case in the Patent Office.

Signed and sealed this 24th day of April, A. D. 1951.

[SEAL]

THOMAS F. MURPHY,
*Assistant Commissioner of Patents.*